US010525508B2

(12) United States Patent
Ito et al.

(10) Patent No.: US 10,525,508 B2
(45) Date of Patent: Jan. 7, 2020

(54) BLOWING APPARATUS INCLUDING PIEZOELECTRIC VALVE AND OPTICAL GRANULAR MATERIAL SORTING MACHINE USING THE BLOWING APPARATUS

(71) Applicant: SATAKE CORPORATION, Tokyo (JP)

(72) Inventors: Takafumi Ito, Tokyo (JP); Sze Keat Chee, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 15/758,158

(22) PCT Filed: Sep. 5, 2016

(86) PCT No.: PCT/JP2016/075945
§ 371 (c)(1),
(2) Date: Mar. 7, 2018

(87) PCT Pub. No.: WO2017/043431
PCT Pub. Date: Mar. 16, 2017

(65) Prior Publication Data
US 2018/0250714 A1    Sep. 6, 2018

(30) Foreign Application Priority Data
Sep. 8, 2015   (JP) .................................. 2015-176659

(51) Int. Cl.
*B07C 5/342*   (2006.01)
*B07C 5/36*    (2006.01)
*F16K 31/00*   (2006.01)

(52) U.S. Cl.
CPC ............ *B07C 5/3425* (2013.01); *B07C 5/362* (2013.01); *B07C 5/366* (2013.01); *F16K 31/004* (2013.01)

(58) Field of Classification Search
CPC ....... B07C 5/342; B07C 5/3425; B07C 5/362; B07C 5/366
(Continued)

(56) References Cited

U.S. PATENT DOCUMENTS 7,351,929 B2 *   4/2008   Afsari ..................... B07C 5/342
                                                         209/580
2006/0226056 A1 * 10/2006   Oestreich ................ B07C 5/368
                                                         209/720
(Continued)

FOREIGN PATENT DOCUMENTS

CN      2162309 Y     4/1994
CN    101317280 A    12/2008
(Continued)

*Primary Examiner* — Terrell H Matthews
(74) *Attorney, Agent, or Firm* — Drinker Biddle & Reath LLP

(57) ABSTRACT

The present invention has an object to provide a blowing apparatus wherein a piezoelectric element is unlikely to cause insulation deterioration leading to burnout during use of the blowing apparatus. The blowing apparatus of the present invention blows compressed gas supplied from a compressed gas supply unit through a nozzle hole of a nozzle unit by opening a piezoelectric valve. The blowing apparatus comprises a humidity sensor detecting a humidity of the compressed gas inside a flow path unit, and a humidity control unit comparing a detected value of the humidity detected by the humidity sensor with a set value. If the humidity of the compressed gas inside the flow path unit detected by the humidity sensor is equal to or greater than the set value, the humidity control unit replaces the compressed gas inside the flow path unit with the compressed
(Continued)

gas whose humidity is less than the set value and which is supplied from the compressed gas supply unit, before starting to use the blowing apparatus.

10 Claims, 5 Drawing Sheets

(58) Field of Classification Search
USPC .................................. 209/552, 606, 932
See application file for complete search history.

(56) References Cited

U.S. PATENT DOCUMENTS

| | | | |
|---|---|---|---|
| 2007/0187299 A1* | 8/2007 | Valerio | B03B 5/44 209/12.1 |
| 2009/0295170 A1* | 12/2009 | Tell | F04F 5/44 290/1 A |
| 2010/0006678 A1 | 1/2010 | Sato | |
| 2011/0284431 A1 | 11/2011 | Ito et al. | |
| 2011/0316937 A1 | 12/2011 | Arakawa et al. | |
| 2013/0255670 A1* | 10/2013 | Ott | A61M 13/003 128/200.14 |
| 2014/0339141 A1 | 11/2014 | Ito et al. | |

FOREIGN PATENT DOCUMENTS

| | | | | |
|---|---|---|---|---|
| CN | 102261506 A | | 11/2011 | |
| CN | 102299253 A | | 12/2011 | |
| JP | 2011-135001 A | | 7/2011 | |
| JP | 2011135001 | * | 7/2011 | ........... B07C 5/3425 |
| JP | 2011135001 A | * | 7/2011 | ........... B07C 5/3425 |
| JP | 2013-124695 A | | 6/2013 | |
| JP | 2013124695 A | * | 6/2013 | ........... B07C 5/3425 |
| JP | 5764049 B2 | | 8/2015 | |
| JP | 2017051894 A | * | 3/2017 | ........... B07C 5/3425 |

* cited by examiner

BLOWING APPARATUS INCLUDING PIEZOELECTRIC VALVE AND OPTICAL GRANULAR MATERIAL SORTING MACHINE USING THE BLOWING APPARATUS

CROSS REFERENCE TO PRIOR APPLICATIONS

This application is the National Stage of International Application No. PCT/JP2016/075945 filed Sep. 5, 2016 and claims benefit of Japanese Application No. 2015-176659 filed on Sep. 8, 2015, which are herein incorporated by reference in their entirety.

TECHNICAL FIELD

The present invention relates to a blowing apparatus including a piezoelectric valve opening and closing a valve using displacement of a piezoelectric element and an optical granular material sorting machine using the blowing apparatus.

BACKGROUND ART

There has conventionally known an optical granular material sorting machine that sorts non-defective products and defective products by blowing granular materials such as grains and resin pellets or removes foreign materials or the like mixed into the granular materials by air blowing.

This type of granular material sorting machine sorts the granular materials falling along a predetermined trajectory from an end portion of a conveying path by removing defective products based on a detection signal indicating the defective products or the like by air blowing.

The above granular material sorting machine blows only the defective products or the like by air from among the granular materials falling continuously and in large quantity. In order to blow only the defective products or the like with high accuracy while keeping other granular materials intact, the blowing apparatus needs to include a valve with excellent responsiveness.

In light of this, there has been proposed a piezoelectric valve that can open and close a valve at high speed using a piezoelectric element (see Patent Literature 1).

The piezoelectric valve uses characteristics of the piezoelectric element having excellent high-speed responsiveness and includes a displacement magnification mechanism that magnifies a small displacement of the piezoelectric element based on lever principle.

In the piezoelectric valve, when a voltage is applied to the piezoelectric element, a displacement in an extending direction of the piezoelectric element is transmitted to a valve body via the displacement magnification mechanism and causes the valve body to quickly move and the piezoelectric valve to open.

Then, in the piezoelectric valve, when the voltage application to the piezoelectric element is canceled, a restoring force of the piezoelectric element trying to return to its original state is transmitted to the valve body via the displacement magnification mechanism and causes the valve body to quickly abut against a valve seat and the piezoelectric valve to close.

Accordingly, the blowing apparatus including the piezoelectric valve includes a blowing nozzle incorporating a plurality of piezoelectric valves arranged in parallel with each other; and a compressed air supply device supplying compressed air to the blowing nozzle. A drive unit selectively drives the plurality of piezoelectric valves to blow the compressed air through each nozzle hole of the blowing nozzle.

Moreover, since the responsiveness at the time of opening and closing the piezoelectric valve is markedly superior to that of the conventional electromagnetic valve, the optical granular material sorting machine using the blowing apparatus can blow off the defective products or the like with high precision and is less likely to blow off the non-defective products.

Furthermore, the piezoelectric element has excellent characteristics such as low energy consumption associated with operation, being suitable for high-speed operation, and reduction in size.

However, since the piezoelectric element is vulnerable to a high-humidity environment, the use of the piezoelectric valve in a high-humidity environment may cause an insulation deterioration which is considered to be caused by migration, leading to burnout.

CITATION LIST

Patent Literature

[Patent Literature 1] Japanese Patent No. 5764049

SUMMARY OF INVENTION

Technical Problem

Accordingly, the present invention has an object to provide a blowing apparatus including a piezoelectric valve opening and closing a valve using displacement of a piezoelectric element, wherein the piezoelectric element is unlikely to cause insulation deterioration leading to burnout during use of the blowing apparatus.

Further, the present invention has an object to provide an optical granular material sorting machine using the blowing apparatus, wherein the piezoelectric element provided in the blowing apparatus is unlikely to cause insulation deterioration leading to burnout during use of the blowing apparatus.

Solution to Problem

In order to achieve the above object, the present invention provides a blowing apparatus comprising:

a piezoelectric valve opening and closing a valve using displacement of a piezoelectric element;

a compressed gas supply unit including a compressor and means of drying compressed gas compressed by the compressor such that a humidity thereof is less than a set value;

a nozzle unit blowing the compressed gas supplied from the compressed gas supply unit through a nozzle hole; and a flow path unit supplying the compressed gas from the compressed gas supply unit to the nozzle unit, wherein the compressed gas supplied from the compressed gas supply unit is blown through the nozzle hole of the nozzle unit by opening the piezoelectric valve, the blowing apparatus comprising:

a humidity sensor detecting a humidity of the compressed gas inside the flow path unit; and a humidity control unit comparing a detected value of the humidity detected by the humidity sensor with a set value, and wherein if the humidity of the compressed gas inside the flow path unit detected by the humidity sensor is equal to or greater than the set value, the humidity control unit controls replacing of the compressed gas inside the flow path unit with the compressed gas whose humidity is less than the set value and which is supplied from the compressed gas supply unit, before starting to use the blowing apparatus.

It is preferable in the present invention that the humidity control unit repeatedly controls opening and closing of the piezoelectric valve to discharge the compressed gas whose humidity is equal to or greater than the set value through the nozzle hole, thereby to replace the compressed gas inside the flow path unit with the compressed gas supplied from the compressed gas supply unit.

It is preferable in the present invention that a compressed gas discharge valve is provided on the nozzle unit side of the flow path unit, and the humidity control unit controls opening of the discharge valve to discharge the compressed gas whose humidity is equal to or greater than the set value through the discharge valve, thereby to replace the compressed gas inside the flow path unit with the compressed gas supplied from the compressed gas supply unit.

It is preferable in the present invention that the piezoelectric valve comprises a gas pressure chamber receiving the compressed gas supplied from the compressed gas supply unit; and a gas discharge passage discharging the compressed gas from the gas pressure chamber, and the piezoelectric valve further comprises a valve body disposed in the gas pressure chamber and opening and closing the gas discharge passage; a piezoelectric element generating a driving force necessary for operation of the valve body as a displacement; and a displacement magnification mechanism magnifying the displacement of the piezoelectric element to act on the valve body, wherein a voltage is applied to the piezoelectric element to expand the piezoelectric element to open the valve body.

In order to achieve the above object, the present invention provides an optical granular material sorting machine comprising: transfer means of transferring objects to be sorted; optical detection means of detecting objects to be sorted falling from an end portion of the transfer means at a detection position; and a blowing apparatus disposed further below the optical detection means and blowing the objects to be sorted by blowing compressed gas based on a detection result by the optical detection means, wherein the blowing apparatus is the blowing apparatus according to any one of the above, and if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus.

Advantageous Effects of Invention

According to the blowing apparatus of the present invention, before starting to use the blowing apparatus, the humidity sensor detects the humidity of the compressed gas inside the flow path unit. If the detected humidity is equal to or greater than the set value, the humidity control unit replaces the compressed gas inside the flow path unit with the compressed gas whose humidity is less than the set value and which is supplied from the compressed gas supply unit. Therefore, the piezoelectric element used in the piezoelectric valve is unlikely to cause insulation deterioration leading to burnout during use of the blowing apparatus.

The blowing apparatus of the present invention is assumed to operate such that the humidity control unit repeats opening and closing of the piezoelectric valve to discharge the compressed gas whose humidity is equal to or greater than the set value through the nozzle hole, thereby to replace a high humidity compressed gas inside the flow path unit with a low humidity compressed gas supplied from the compressed gas supply unit. Then, the surface of the piezoelectric element is heated by expansion and contraction of the piezoelectric element during opening and closing of the piezoelectric valve, thus increasing the surface temperature of the piezoelectric element and resultantly decreasing the relative humidity of the surface of the piezoelectric element. Therefore, even if the high humidity compressed gas inside the flow path unit is discharged through the nozzle hole, the piezoelectric element is unlikely to cause insulation deterioration leading to burnout.

The blowing apparatus of the present invention is assumed to operate such that the compressed gas discharge valve is provided on the nozzle unit side of the flow path unit and the humidity control unit opens the discharge valve to discharge the compressed gas whose humidity is equal to or greater than the set value from the discharge valve thereby to replace the high humidity compressed gas inside the flow path unit with the low humidity compressed gas supplied from the compressed gas supply unit. Then, the high humidity compressed gas inside the flow path unit can be easily discharged.

The optical granular material sorting machine of the present invention is such that the blowing apparatus is the blowing apparatus according to any one of the above and if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus. Therefore, the piezoelectric element provided in the blowing apparatus is unlikely to cause insulation deterioration leading to burnout during use of the blowing apparatus.

DESCRIPTION OF EMBODIMENT

An embodiment of the present invention will be described with reference to the accompanying drawings.
<Piezoelectric Valve>

Figure 1:
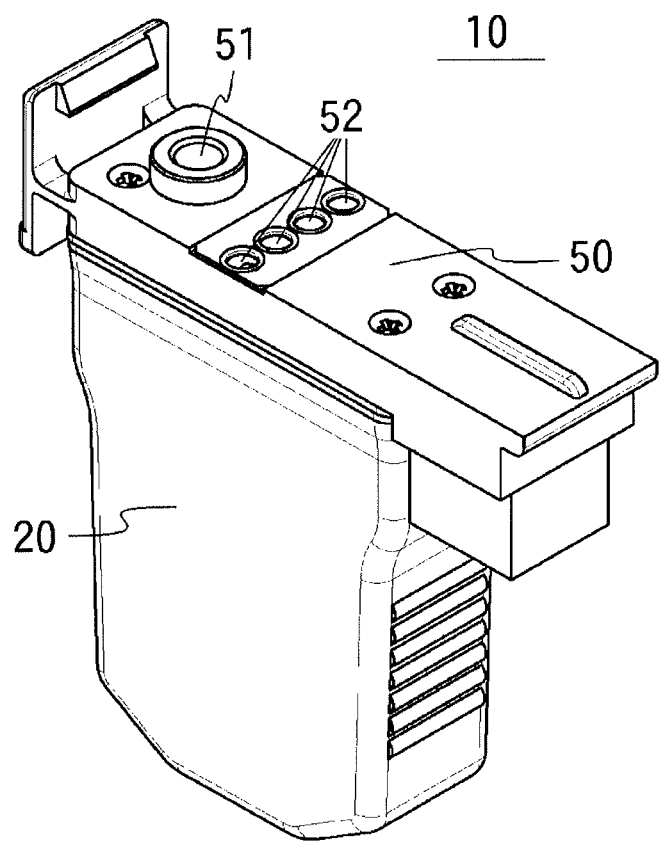
FIG. 1 is a perspective view of a piezoelectric valve.
Figure 2:
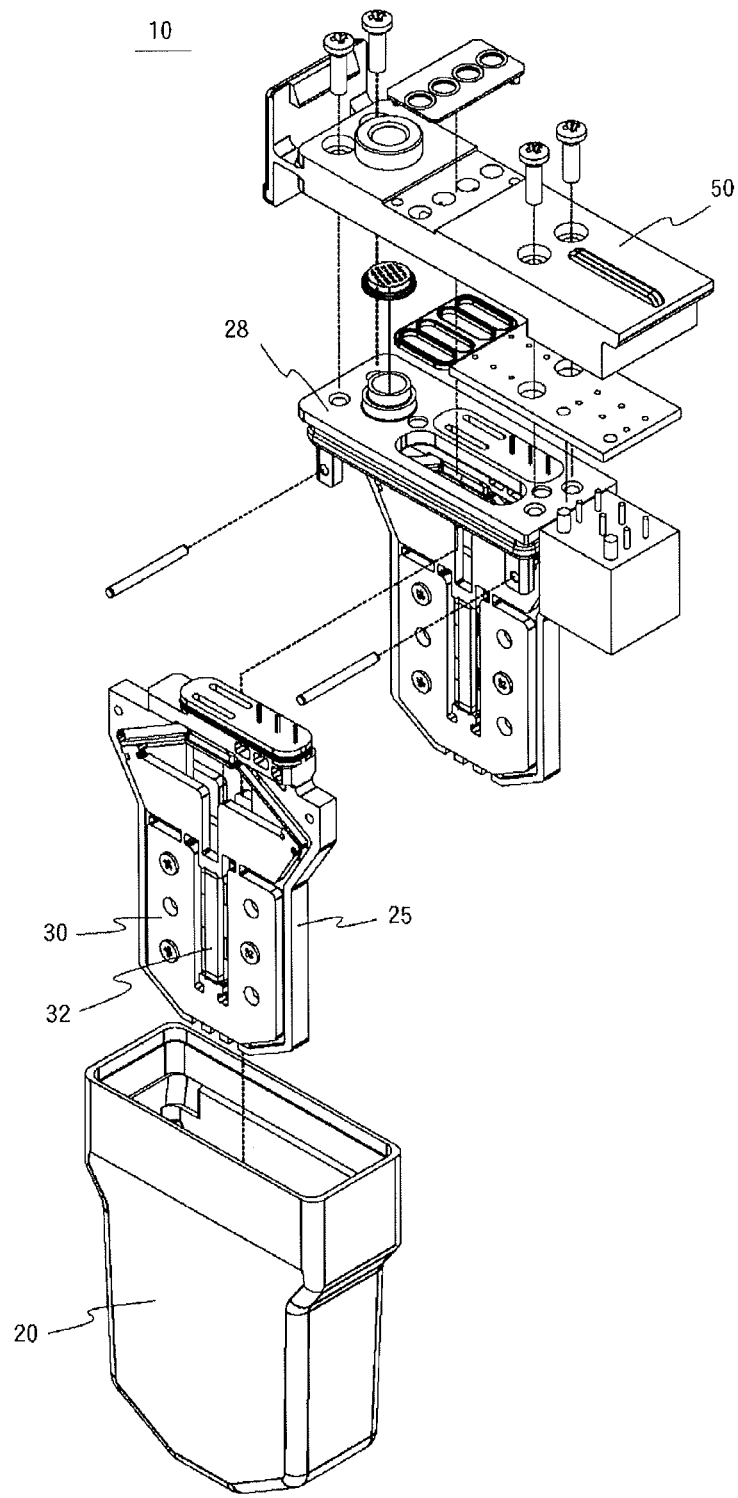
FIG. 2 is an exploded assembly view of the piezoelectric valve.
Figure 3:
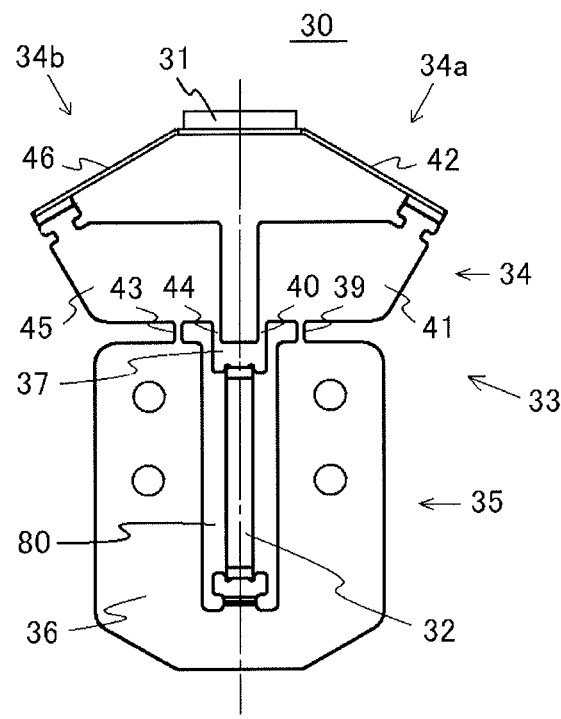
FIG. 3 is an explanatory view of an actuator.
Figure 4:
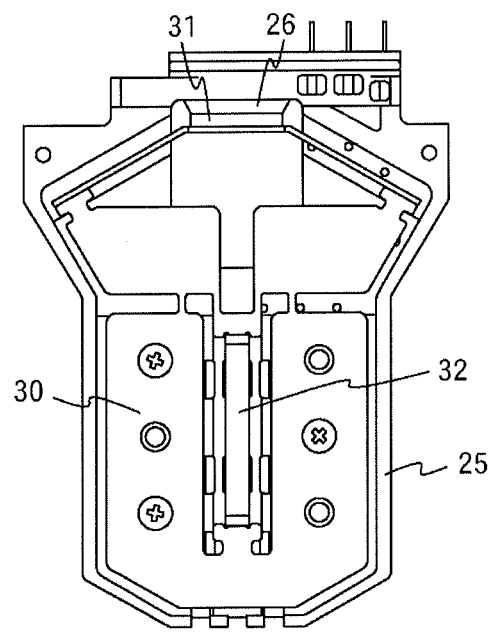
FIG. 4 is an explanatory view of a state where the actuator is fixed to a valve seat plate.
Figure 5:
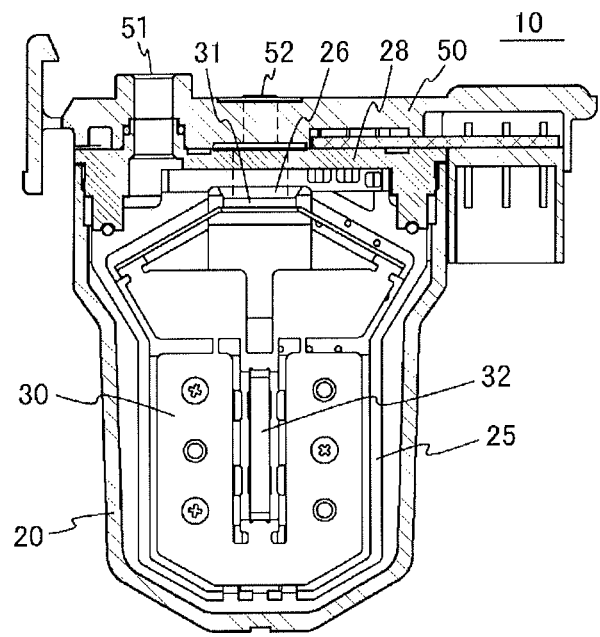
FIG. 5 is a sectional view of the piezoelectric valve, explaining a state where the valve seat plate is disposed inside a valve main body.

FIG. 1 illustrates a perspective view of a piezoelectric valve. FIG. 2 illustrates an exploded assembly view of the piezoelectric valve. FIG. 3 illustrates an explanatory view of an actuator. FIG. 4 illustrates an explanatory view of a state where the actuator is fixed to a valve seat plate. FIG. 5 illustrates a sectional view of the piezoelectric valve, explaining a state where the valve seat plate is disposed in a valve main body.

A piezoelectric valve 10 includes a valve main body 20, a valve seat plate 25 disposed inside the valve main body 20 and fixed to the valve main body 20, and an actuator 30 fixed to both surfaces of the valve seat plate 25 with screws.

The valve main body 20 is a case whose front surface is opened and includes therein a gas pressure chamber receiving compressed gas supplied from an external compressed gas supply source (unillustrated).

Moreover, the front surface of the valve main body 20 includes a connector portion 50. The front surface of the connector portion 50 further includes a gas inlet port 51 for sucking compressed gas into the valve main body 20 and gas outlet ports 52 for discharging the compressed gas.

The valve seat plate 25 includes an attachment portion of the actuator 30 on both surfaces thereof and a valve seat 26 abutted by a later-described valve body 31 of the actuator 30. The valve seat plate 25 includes a gas discharge passage formed to communicate from the valve seat surface of the valve seat 26 to the outlet ports 52 being opened in the front surface of the connector portion 50.

Moreover, the front surface of the valve seat plate 25 includes a lid material 28 for closing the opening of the case. The lid material 28 includes a gas inlet passage formed to communicate from the inlet port 51 being opened in the front surface of the connector portion 50 into the valve main body 20.

As illustrated in FIG. 3, the actuator 30 includes a valve body 31 made of rubber, preferably, sliding rubber, a piezoelectric element 32 for generating a driving force necessary for operation of the valve body 31 as displacement, and a displacement magnification mechanism 33 for magnifying the displacement of the piezoelectric element 32 to act on the valve body 31.

The displacement magnification mechanism 33 includes a displacement magnification unit 34 for magnifying the displacement of the piezoelectric element 32, and a displacement transmission unit 35 for transmitting the displacement of the piezoelectric element 32 to the displacement magnification unit 34, each of which is disposed symmetrically with respect to an axis in the operation direction of the valve body 31, herein, a straight line (hereinafter referred to as "center line") connecting the longitudinal axes of the valve body 31 and the piezoelectric element 32.

The displacement transmission unit 35 includes a U-shaped base substrate 36 joined to one end of the piezoelectric element 32, and a cap member 37 joined to the other end of the piezoelectric element 32. The piezoelectric element 32 is disposed in a space of the U-shaped base substrate 36, and then the displacement magnification mechanism 33 is disposed symmetrically about the longitudinal axis of piezoelectric element 32.

Here, the piezoelectric element 32 is located in a space of the U-shaped base substrate 36 and incorporated between the U-shaped bottom portion of the base substrate 36 and the cap member 37. By plastically deforming the U-shaped bottom portion of the base substrate 36, the one end is joined to the U-shaped bottom portion of the base substrate 36 and the other end is joined to the cap member 37.

The displacement magnification unit 34 includes first and second displacement magnification units 34a and 34b disposed symmetrically with respect to the center line.

The first displacement magnification unit 34a includes first and second hinges 39 and 40, a first arm 41, and a first leaf spring 42. One end of the first hinge 39 is integrated with an end on one side of the U-shaped base substrate 36, and one end of the second hinge 40 is integrated with the cap member 37. An outer end portion of the first arm 41 is joined to one end of the first leaf spring 42, and the other end of the first leaf spring 42 is joined to a side end portion on one side of the valve body 31.

Meanwhile, the second displacement magnification unit 34b includes third and fourth hinges 43 and 44, a second arm 45, and a second leaf spring 46. One end of the third hinge 43 is integrated with an end on the other side of the U-shaped base substrate 36, and one end of the fourth hinge 44 is integrated with the cap member 37. An outer end portion of the second arm 45 is joined to one end of the second leaf spring 46, and the other end of the second leaf spring 46 is joined to a side end portion on the other side of the valve body 31.

Here, the displacement magnification mechanism 33 can be integrally molded, for example, by punching out a metal material such as a stainless-steel material.

In the piezoelectric valve 10, the actuator 30 operates such that when power is supplied to the piezoelectric element 32 in a closed-valve state, the piezoelectric element 32 expands. The displacement caused by expansion of the piezoelectric element 32 is expanded by lever principle with the first and third hinges 39 and 43 as the fulcrum, the second and fourth hinges 40 and 44 as the point of effort, and the outer end portions of the first and second arms 41 and 45 as the point of application of force in the displacement magnification mechanism 33 to largely displace the outer end portions of the first and second arms 41 and 45.

Then, the displacement of the outer end portions of the first and second arms 41 and 45 separates the valve body 31 from the valve seat 26 via the first and second leaf springs 42 and 46 to open the gas discharge passage.

Meanwhile, the actuator 30 operates such that when the conduction to the piezoelectric element 32 is released, the piezoelectric element 32 contracts. Then, the contraction causes the valve body 31 to be seated on the valve seat 26 via the displacement magnification mechanism 33 to close the gas discharge passage.

<Blowing apparatus>

Figure 6:
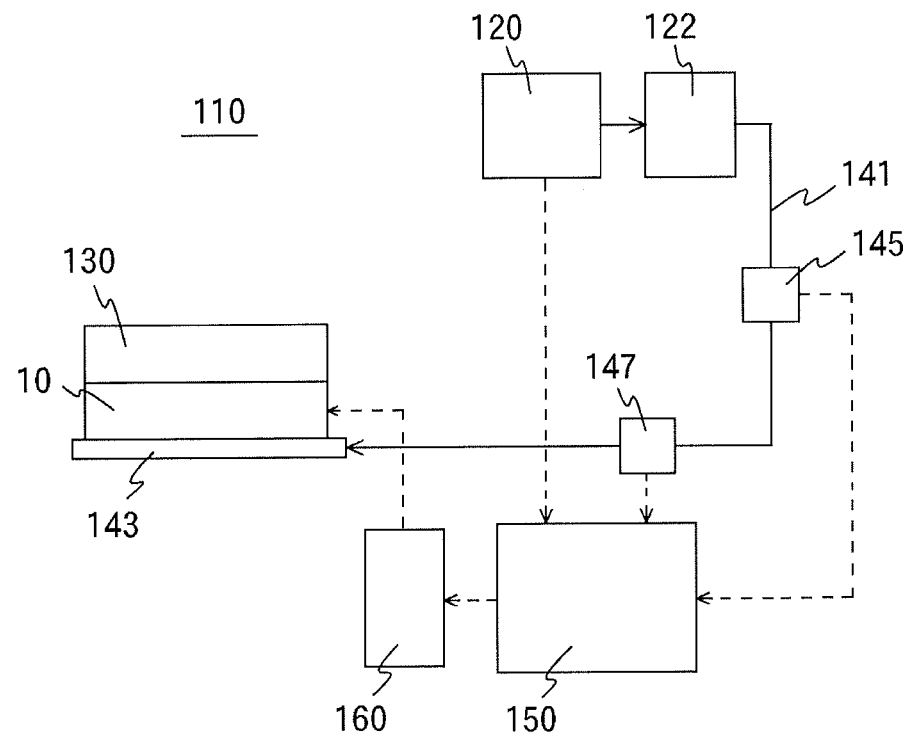
FIG. 6 is a control block diagram of a blowing apparatus.

Then, the blowing apparatus including the piezoelectric valve 10 will be described. FIG. 6 illustrates a control block diagram of the blowing apparatus. The blowing apparatus 110 includes a compressed gas supply source 120 including a compressor and a dryer such as a freezing type dryer and an adsorption type dryer for drying gas compressed by the compressor; a regulator 122 for regulating the pressure of the compressed gas supplied from the compressed gas supply source 120; a blowing nozzle 130 for blowing the compressed gas whose pressure is regulated by the regulator 122 through a plurality of nozzle holes thereof; and a pipe 141 and a manifold 143 serving as a flow path for supplying the compressed gas from the compressed gas supply source to the blowing nozzle 130.

The blowing apparatus 110 includes a plurality of piezoelectric valves 10 illustrated in FIGS. 1 to 5 disposed in parallel in the blowing nozzle 130 or along the flow path near the blowing nozzle 130, and blows the low humidity compressed gas supplied from the compressed gas supply source 120 through each nozzle hole of the blowing nozzle 130 by opening and closing the piezoelectric valves 10.

In the blowing apparatus 110, the pipe 141 includes a pressure sensor 145 for detecting the pressure inside the flow path; and a humidity sensor 147 for detecting the relative humidity of the gas inside the flow path.

Moreover, the blowing apparatus 110 includes a humidity control device 150 and a drive unit 160. The humidity control device 150 compares the set value of a humidity that is assumed to be inputted by the operator with the value of the humidity detected by the humidity sensor 147. The drive unit 160 drives opening and closing of the piezoelectric valve 10 or a later-described discharge valve based on a signal from the humidity control device 150.

Before starting to use the blowing apparatus 110, the humidity control device 150 uses a power supply signal of the compressed gas supply source 120 and a pressure signal of the pressure sensor 145 as the input signals to compare the set value of the humidity (for example, 30% RH) with the value of the humidity detected by the humidity sensor 147 in the state where the low humidity compressed gas is supplied from the compressed gas supply source 120.

Then, as a result of the comparison by the humidity control device 150, if the value of the humidity detected by the humidity sensor 147 is equal to or greater than the set value (for example, 30% RH), the high humidity compressed gas existing (remaining) inside the flow path is replaced with the compressed gas with low humidity (for example, less than 30% RH) supplied from the compressed gas supply source 120, before starting to use the blowing apparatus 110.

As described above, the blowing apparatus 110 replaces the high humidity compressed gas existing inside the flow path with the low humidity compressed gas, before starting to use the blowing apparatus 110. Then, the piezoelectric element 32 used in the piezoelectric valve 10 is unlikely to cause insulation deterioration leading to burnout during use of the blowing apparatus 110.

The blowing apparatus 110 can discharge the high humidity compressed gas through the nozzle holes of the blowing nozzle 130 by causing the drive unit 160 to repeatedly drive opening and closing of the piezoelectric valve 10 at a high speed (such as about 100 Hz) based on the signal from the humidity control device 150.

As described above, the blowing apparatus 110 needs not have any special device configuration as long as when the high humidity compressed gas existing inside the flow path is replaced with the low humidity compressed gas supplied from the compressed gas supply source 120, the high humidity compressed gas is discharged through the nozzle holes of the blowing nozzle 130.

Further, blowing apparatus 110 is assumed to operate such that the drive unit 160 repeatedly drives opening and closing of the piezoelectric valve 10 at high speed. Then, the surface of the piezoelectric element 32 is heated by expansion and contraction of the piezoelectric element 32 during opening and closing of the piezoelectric valve 10, thus increasing the surface temperature of the piezoelectric element 32 and resultantly decreasing the relative humidity of the surface of the piezoelectric element 32. Therefore, even if the high humidity compressed gas existing inside the flow path is discharged through the nozzle holes of the blowing nozzle 130, the piezoelectric element 32 is unlikely to cause insulation deterioration leading to burnout.

Moreover, the blowing apparatus 110 is configured such that an unillustrated discharge valve such as a magnetic valve is provided on the end portion side of the manifold 143. Then, the drive unit 160 opens the discharge valve based on the signal from the humidity control device 150. Thus, the high humidity compressed gas can be discharged from the discharge valve.

As described above, the blowing apparatus 110 is assumed to operate such that when the high humidity compressed gas existing inside the flow path is replaced with the low humidity compressed gas supplied from the compressed gas supply source 120, the high humidity compressed gas is discharged from the discharge valve. Then, the high humidity compressed gas can be easily discharged.

Note that the humidity control device 150 uses the pressure signal of the pressure sensor 145 as the input signal to compare the set value with the value detected by the humidity sensor 147. Then, if the detected value is equal to or greater than the set value, the remaining gas is replaced with the low humidity gas, before starting to use the blowing apparatus 110. This comparison operation between the set value and the detected value may be continuously (in seconds) performed not only before but also after starting to use the blowing apparatus 110.

Therefore, even if the humidity of the compressed gas increases due to a failure of a dryer or the like during use of the blowing apparatus 110, the blowing apparatus 110 can be stopped to prevent insulation deterioration phenomena of the piezoelectric element 32 used in the piezoelectric valve 10.

<Optical Granular Material Sorting Machine>

Then, the optical granular material sorting machine using the blowing apparatus 110 will be described.

Figure 7:
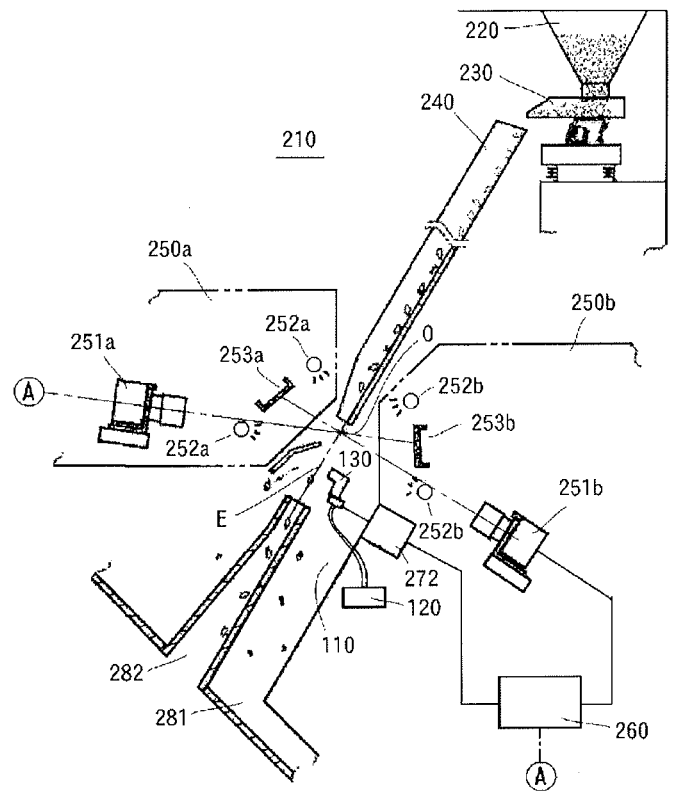
FIG. 7 is a sectional side view of essential parts of an optical granular material sorting machine.
Figure 8:
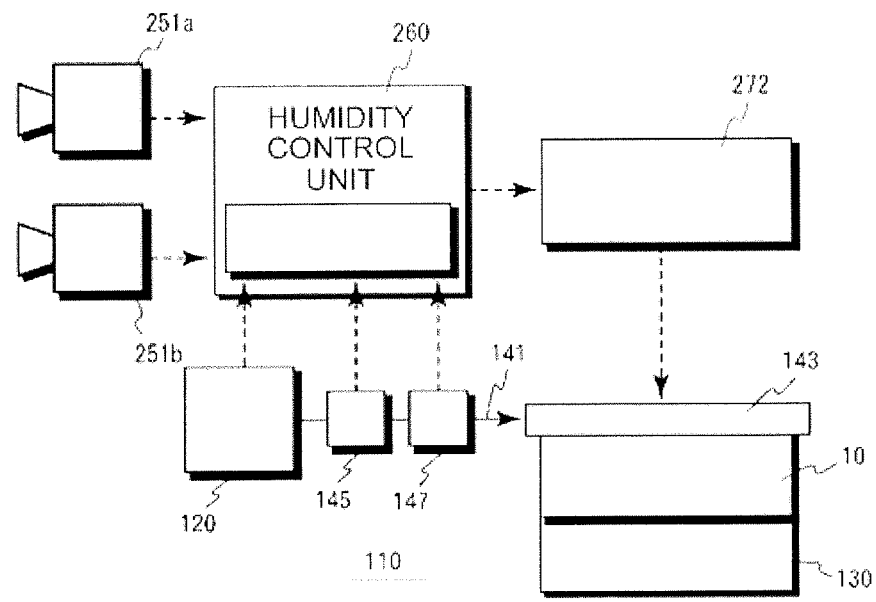
FIG. 8 is a control block diagram of the optical granular material sorting machine.

FIG. 7 is a sectional side view illustrating the simplified internal structure of the essential parts of the optical granular material sorting machine. FIG. 8 illustrates a control block diagram of the optical granular material sorting machine.

The optical granular material sorting machine 210 includes a granular material supply unit including a tank 220 and a vibrating feeder 230 disposed at an upper portion thereof. An inclined chute 240 having a predetermined width is disposed below the granular material supply unit.

Granular materials supplied from the granular material supply unit spread out across the width direction on the inclined chute 240 and flow down naturally in a continuous manner, and then are released into the air along a predetermined falling trajectory from the lower end thereof.

At least a pair of optical detection devices 250*a* and 250*b* are disposed facing each other before and after the predetermined falling trajectory to image granular materials at a granular material detection position 0 extending linearly in parallel in the width direction of the inclined chute 240. Each of the optical detection devices 250*a* and 250*b* includes imaging means 251*a* and 251*b* such as a CCD camera incorporating a CCD line sensor; illumination means 252*a* and 252*b* such as a fluorescent lamp and an LED; and backgrounds 253*a* and 253*b* serving as the background for use in imaging the granular materials.

Moreover, the blowing apparatus 110 for removing the defective products or the like by blowing the compressed gas is disposed below the granular material detection position O. The blowing apparatus 110 is illustrated in FIG. 6 and includes blowing nozzles 130 incorporating a plurality of the piezoelectric valves 10 arranged in parallel with each other; a compressed gas supply source 120 supplying compressed gas to the blowing nozzle 130; and a flow path including a pipe 141 connecting the compressed gas supply source 120 and the blowing nozzle 130, wherein the flow path includes a pressure sensor 145 detecting the pressure inside the flow path and a humidity sensor 147 detecting the relative humidity of the gas inside the flow path.

Furthermore, the optical granular material sorting machine 210 includes a drive unit 272 for driving expanding and contracting of the piezoelectric element 32 of the piezoelectric valve 10 based on the detection result of the granular materials released from the lower end of the inclined chute 240 by each of the optical detection devices 250a and 250b.

In the optical granular material sorting machine 210, the granular materials spread out across the width direction on the inclined chute 240 and flow down naturally in a continuous manner, and then are released into the air along a predetermined falling trajectory from the lower end thereof. Then, the granular materials are imaged at the granular material detection position 0 by the imaging means 251a and 251b of the respective optical detection devices 250a and 250b, and the imaged data is transmitted to the control device 260. The control device 260 identifies the granular materials to remove the defective products or the like based on the imaged data; acquires information about the size and the like of the granular materials; and transmits a discharge signal indicating the defective products or the like to the drive unit 272.

The blowing apparatus 110 selectively drives the plurality of piezoelectric valves 10 based on the discharge signal transmitted to the drive unit 272 to blow the compressed gas through each nozzle hole of the blowing nozzle 130 provided corresponding to each position in the width direction toward the defective products or the like passing through the granular material discharge position E extending linearly in parallel in the width direction of the inclined chute 240.

Then, the defective products or the like blown by the air through each nozzle hole of the blowing nozzle 130 are discharged outside through the defective product outlet port 281. Meanwhile, the non-defective products or the like passing along the predetermined falling trajectory as is without being blown off are recovered through the non-defective product outlet port 282.

Here, even if the blowing apparatus 110 is used in the optical granular material sorting machine 210, at the time of starting the operation of the optical granular material sorting machine 210, before starting to use the blowing apparatus 110, as described above, the high humidity compressed gas existing (remaining) inside the flow path can be replaced with the low humidity compressed gas.

In this case, the humidity control unit of the control device 260 in the optical granular material sorting machine 210 serves as the humidity control device 150 of the blowing apparatus 110 illustrated in FIG. 6.

Thus, as long as the blowing apparatus 110 replaces the high humidity compressed gas existing inside the flow path with the low humidity compressed gas before starting to use the blowing apparatus 110, even if the optical granular material sorting machine 210 is operated, as described above, the piezoelectric element 32 used in the piezoelectric valve 10 is unlikely to cause insulation deterioration leading to burnout during use of the blowing apparatus 110.

Moreover, if the humidity sensor 147 detects a humidity equal to or greater than the set value (for example, 30% RH) during operation of the optical granular material sorting machine 210, the control device 26 issues a warning or stops the operation of the optical granular material sorting machine 210, thereby securing the safety of the piezoelectric element 32 used in the piezoelectric valve 10.

Examples of typical granular materials to be sorted by the optical granular material sorting machine include cereal grains, particularly rice grains, but are not necessarily limited to grains, and any materials can be used as long as the materials have a size and mass that can be blown off by air blowing.

It should be noted that the present invention is not limited to the above embodiment, and it is obvious that the configuration can be appropriately modified as long as without departing from the scope of the present invention.

INDUSTRIAL APPLICABILITY

The present invention provides a blowing apparatus including a piezoelectric valve opening and closing a valve using displacement of a piezoelectric element and is extremely useful in that the piezoelectric element is unlikely to cause insulation deterioration leading to burnout during use of the blowing apparatus.

Moreover, the present invention provides an optical granular material sorting machine using the blowing apparatus and is extremely useful in that the piezoelectric element provided in the blowing apparatus is unlikely to cause insulation deterioration leading to burnout during use of the blowing apparatus.

REFERENCE SIGNS LIST

10 piezoelectric valve
20 valve main body
25 valve seat plate
26 valve seat
28 lid material
30 actuator
31 valve body
32 piezoelectric element
33 displacement magnification mechanism
50 connector portion
51 gas inlet port
52 gas outlet port
110 blowing apparatus
120 compressed gas supply source
122 regulator
130 blowing nozzle
141 pipe
143 manifold
145 pressure sensor
147 humidity sensor
150 humidity control device
160 drive unit
210 optical granular material sorting machine
240 inclined chute
250a, 250b optical detection device
251a, 251b CCD camera (imaging means)
260 control device
272 drive unit

The invention claimed is:
1. A blowing apparatus comprising:
a piezoelectric valve opening and closing a valve using displacement of a piezoelectric element;
a compressed gas supply unit including a compressor and a unit of drying compressed gas compressed by the compressor such that a humidity thereof is less than a set value;
a nozzle unit in which the piezoelectric valve is disposed, the nozzle unit blowing the compressed gas supplied from the compressed gas supply unit through a nozzle hole; and
a flow path unit supplying the compressed gas from the compressed gas supply unit to the nozzle unit, wherein the compressed gas supplied from the compressed gas supply unit is blown through the nozzle hole of the nozzle unit by opening the piezoelectric valve, disposed in the nozzle unit, the blowing apparatus comprising:
a humidity sensor arranged inside the flow path unit and detecting a humidity of the compressed gas inside the flow path unit; and
a humidity control unit comparing a detected value of the humidity detected by the humidity sensor with a set value, and wherein
if the humidity of the compressed gas inside the flow path unit detected by the humidity sensor is equal to or greater than the set value, the humidity control unit controls replacing of the compressed gas inside the flow path unit with the compressed gas whose humidity is less than the set value and which is supplied from the compressed gas supply unit, before starting to use the blowing apparatus.

2. The blowing apparatus according to claim 1, wherein the humidity control unit repeatedly controls opening and closing of the piezoelectric valve to discharge the compressed gas whose humidity is equal to or greater than the set value through the nozzle hole, thereby to replace the compressed gas inside the flow path unit with the compressed gas supplied from the compressed gas supply unit.

3. The blowing apparatus according to claim 1, wherein a compressed gas discharge valve is provided on the nozzle unit side of the flow path unit, and
the humidity control unit controls opening of the discharge valve to discharge the compressed gas whose humidity is equal to or greater than the set value through the discharge valve, thereby to replace the compressed gas inside the flow path unit with the compressed gas supplied from the compressed gas supply unit.

4. The blowing apparatus according to claim 1, wherein the piezoelectric valve comprises a gas pressure chamber receiving the compressed gas supplied from the compressed gas supply unit; and a gas discharge passage discharging the compressed gas from the gas pressure chamber, and
the piezoelectric valve further comprises a valve body disposed in the gas pressure chamber and opening and closing the gas discharge passage; a piezoelectric element generating a driving force necessary for operation of the valve body as a displacement; and a displacement magnification mechanism magnifying the displacement of the piezoelectric element to act on the valve body, wherein
a voltage is applied to the piezoelectric element to expand the piezoelectric element to open the valve body.

5. An optical granular material sorting machine comprising:
a transfer unit of transferring objects to be sorted;
an optical detection unit of detecting objects to be sorted falling from an end portion of the transfer unit at a detection position; and
a blowing apparatus disposed further below the optical detection unit and blowing the objects to be sorted by blowing compressed gas based on a detection result by the optical detection unit, wherein
the blowing apparatus is the blowing apparatus according to claim 1, and
if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus.

6. The blowing apparatus according to claim 2, wherein the piezoelectric valve comprises a gas pressure chamber receiving the compressed gas supplied from the compressed gas supply unit; and a gas discharge passage discharging the compressed gas from the gas pressure chamber, and
the piezoelectric valve further comprises a valve body disposed in the gas pressure chamber and opening and closing the gas discharge passage; a piezoelectric element generating a driving force necessary for operation of the valve body as a displacement; and a displacement magnification mechanism magnifying the displacement of the piezoelectric element to act on the valve body, wherein
a voltage is applied to the piezoelectric element to expand the piezoelectric element to open the valve body.

7. The blowing apparatus according to claim 3, wherein the piezoelectric valve comprises a gas pressure chamber receiving the compressed gas supplied from the compressed gas supply unit; and a gas discharge passage discharging the compressed gas from the gas pressure chamber, and
the piezoelectric valve further comprises a valve body disposed in the gas pressure chamber and opening and closing the gas discharge passage; a piezoelectric element generating a driving force necessary for operation of the valve body as a displacement; and a displacement magnification mechanism magnifying the displacement of the piezoelectric element to act on the valve body, wherein
a voltage is applied to the piezoelectric element to expand the piezoelectric element to open the valve body.

8. An optical granular material sorting machine comprising:
a transfer unit of transferring objects to be sorted;
an optical detection unit of detecting objects to be sorted falling from an end portion of the transfer unit at a detection position; and
a blowing apparatus disposed further below the optical detection unit and blowing the objects to be sorted by blowing compressed gas based on a detection result by the optical detection unit, wherein
the blowing apparatus is the blowing apparatus according to claim 2, and
if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus.

9. An optical granular material sorting machine comprising:
a transfer unit of transferring objects to be sorted;
an optical detection unit of detecting objects to be sorted falling from an end portion of the transfer unit at a detection position; and
a blowing apparatus disposed further below the optical detection unit and blowing the objects to be sorted by blowing compressed gas based on a detection result by the optical detection unit, wherein
the blowing apparatus is the blowing apparatus according to claim 3, and
if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus.

10. An optical granular material sorting machine comprising:
a transfer unit of transferring objects to be sorted;
an optical detection unit of detecting objects to be sorted falling from an end portion of the transfer unit at a detection position; and
a blowing apparatus disposed further below the optical detection unit and blowing the objects to be sorted by blowing compressed gas based on a detection result by the optical detection unit, wherein
the blowing apparatus is the blowing apparatus according to claim 4, and
if the humidity of the compressed gas inside the flow path unit detected by the humidity sensor is equal to or greater than the set value, the compressed gas inside the flow path unit is replaced with the compressed gas whose humidity is less than the set value and which is supplied from the compressed gas supply unit, before starting to use the blowing apparatus.

* * * * *